United States Patent [19]

Brisabois et al.

[11] 4,284,183
[45] Aug. 18, 1981

[54] AUTOMATIC CLUTCH DEVICE

[75] Inventors: Roger Brisabois, Clamart; Gerard Brut, Le Mesnil le Roi, both of France

[73] Assignee: Regie Nationale des Usines Renault, Boulogne-Billancourt, France

[21] Appl. No.: 46,086

[22] Filed: Jun. 6, 1979

[30] Foreign Application Priority Data

Jun. 7, 1978 [FR] France .................................. 78 17023

[51] Int. Cl.³ ....................... F16D 41/08; B60K 17/34
[52] U.S. Cl. .................. 192/48.92; 180/249; 192/38; 192/44; 192/47
[58] Field of Search ....................... 192/38, 44, 43, 47, 192/48.92, 51; 180/248, 249, 250

[56] References Cited

U.S. PATENT DOCUMENTS

| | | | |
|---|---|---|---|
| 1,163,803 | 12/1915 | Bickford | 192/44 |
| 1,735,125 | 11/1929 | Miller | 192/47 |
| 1,927,046 | 9/1933 | Powell | 192/47 X |
| 1,950,694 | 3/1934 | Parkinson | 192/48.92 |
| 2,427,120 | 9/1947 | Blair | 192/43 |
| 2,851,115 | 9/1958 | Buckendale | 180/248 X |
| 2,853,890 | 9/1958 | Kelbel | 180/248 X |
| 3,949,848 | 4/1976 | Fogelber | 192/48.92 X |
| 4,111,288 | 9/1978 | Fogelberg | 192/48.92 X |

FOREIGN PATENT DOCUMENTS 727917 4/1955 United Kingdom ..................... 180/248

*Primary Examiner*—Allan D. Herrmann
*Attorney, Agent, or Firm*—Owen, Wickersham & Erickson

[57] ABSTRACT

An automatic coupling or torque transfer device for connecting an input shaft to an output shaft, comprising a double free-wheel system, each of the elementary free wheels functioning for one rotational direction. Cocking of the free wheels is accomplished by means of the control of the rotational direction. The main application is to the transmission of an automotive vehicle.

12 Claims, 12 Drawing Figures

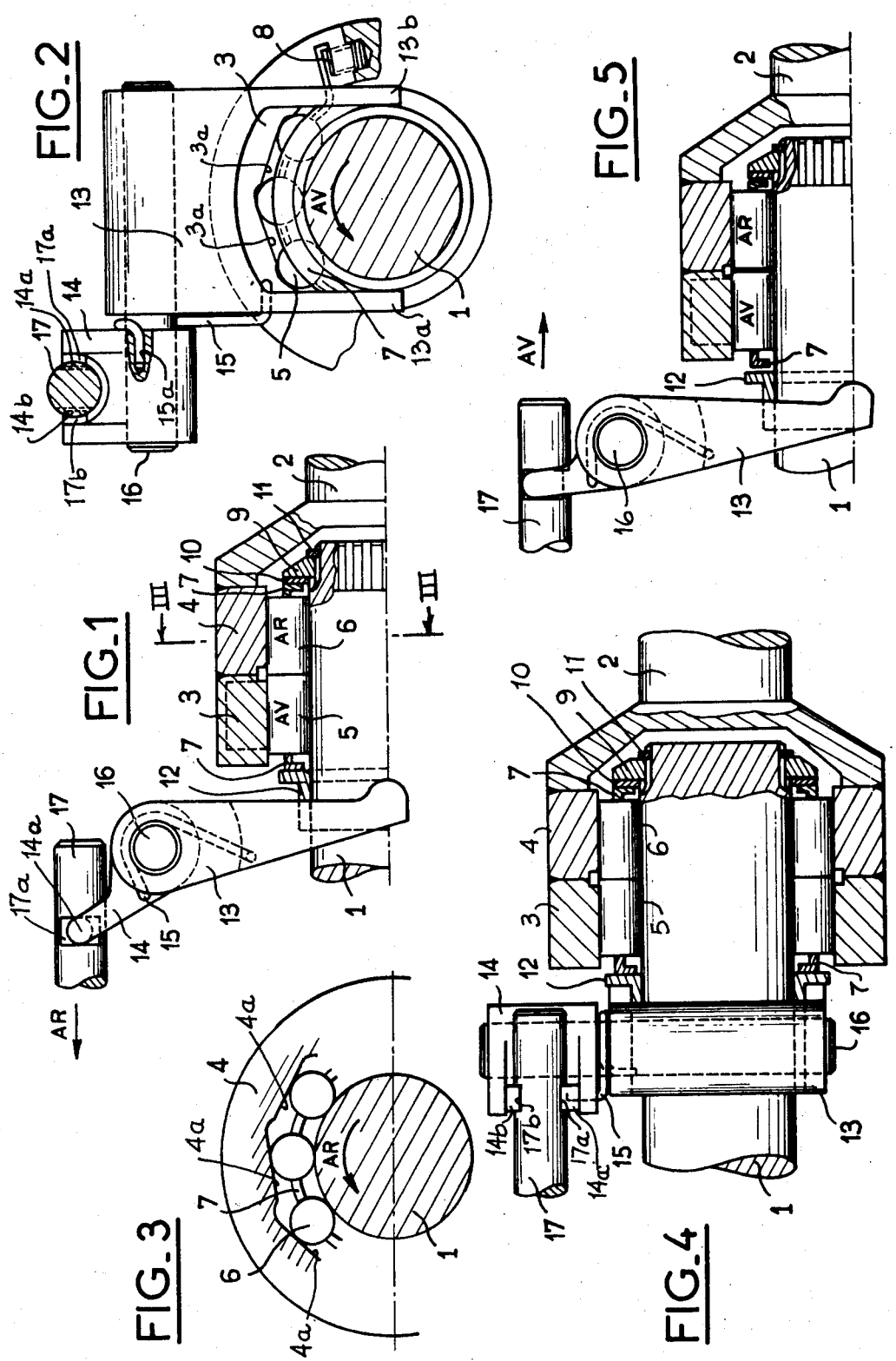

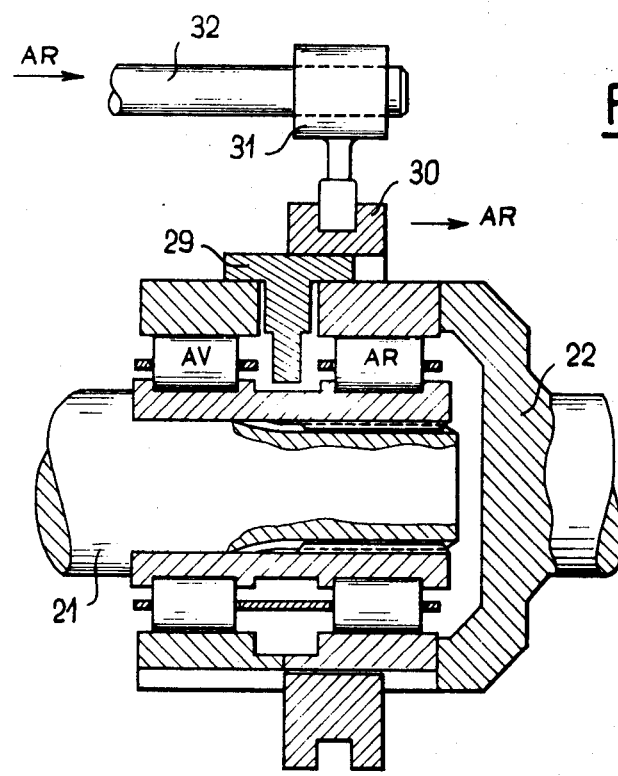
FIG_10
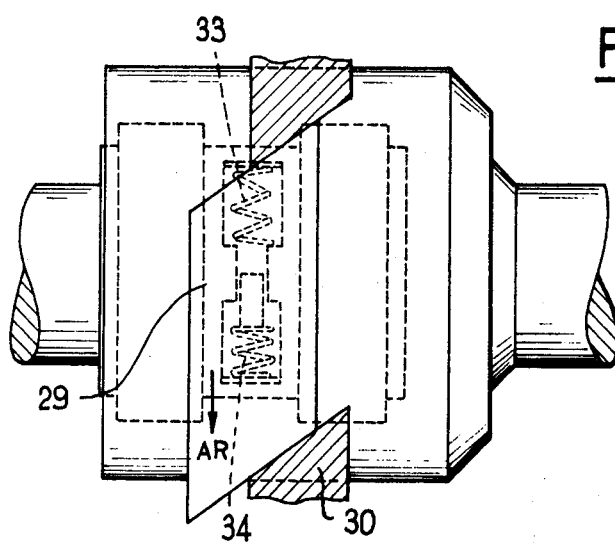
FIG_11

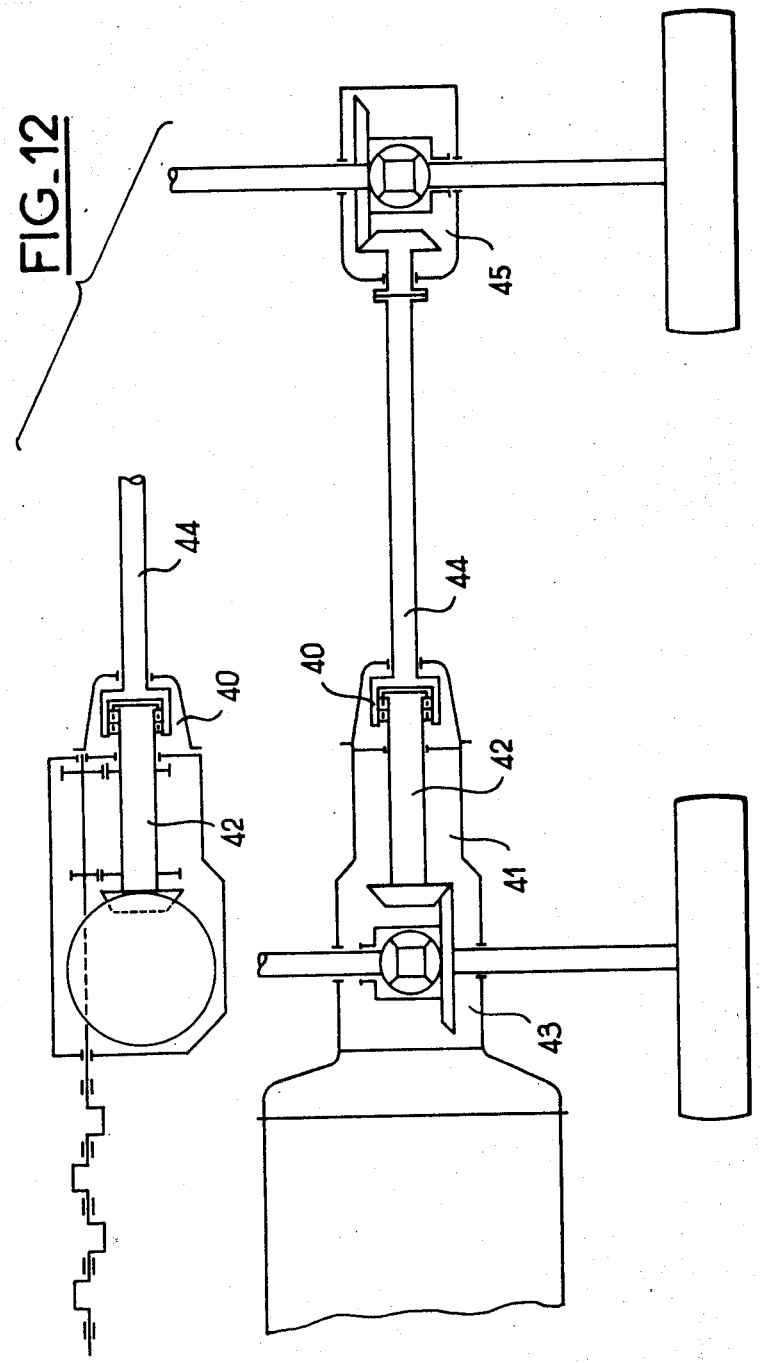

AUTOMATIC CLUTCH DEVICE

BACKGROUND OF THE INVENTION

The present invention relates to a clutch or a coupling transfer device between an input shaft and an output shaft, which functions automatically in each of the two rotational directions, when the difference of speeds (resulting from the mechanical structure) between the output shaft and the input shaft reaches a certain value, the control for the actuation of the device being connected to the control for the direction of rotation or drive.

In the field of automotive vehicles, devices are known for coupling the rear axle with the front axle in the case of a front drive vehicle, or for coupling the front axle with the rear axle in the case of a rear drive vehicle. These devices are generally mechanical dog clutch systems. These systems are disposed on the transmission shaft in two parts, connecting to the two axles. Despite tapering of the clutch's teeth these devices require control of the dog clutch during stopping.

Such known devices have many disadvantages. Specific manual control of the dog clutch is necessary, thus requiring a control lever in addition to a speed control lever. It is a mechanical system which is expensive to manufacture. Sustained attention of the driver to the performance of his vehicle is required in order to decide whether the clutch should be engaged.

SUMMARY OF THE INVENTION

An object of the present invention, therefore, is to provide a coupling or torque transfer device which is automatic, so as to free the driver from all additional surveillance, and which is applicable to both rotational directions by utilizing the existing control for changing the direction of shaft rotation or drive direction.

For this purpose, the object of the invention is a coupling or torque transfer device between an input shaft and an output shaft. This device is automatic; that is, it starts operating when the speed difference (resulting from the mechanical structure) between the output shaft and the input shaft reaches a certain value.

The device functions in both rotational directions.

The device comprises: a double ring connected to the input shaft, a double ring connected to the output shaft, two arrays of a plurality of locking elements mounted between the two rings, a cocking or loading system for the locking elements functioning for both rotational directions and acting on one or the other of the arrays of locking elements according to the selected rotational direction, and a control for the loading system, the control being connected to the selection of the rotational direction.

In this device, the inner double ring can be eliminated, and the locking elements then roll directly on the input shaft.

In a first embodiment, the loading system for the locking elements comprises two different loading systems corresponding to the selected rotational direction.

In a second embodiment, the loading system for the locking elements comprises a single loading system for the two rotational directions.

The device may be used particularly on a transmission for connecting drive wheels or a train of drive wheels on an automotive vehicle.

The present inventin thus has the following advantages:
1. It frees the driver from having to pay sustained attention.
2. It automatically watches over the adherence of the vehicle when applied to an automobile.
3. It eliminates a supplementary control lever.
4. It is a simple and inexpensive system, as will be seen from the examples given hereinbelow.

Other characteristics and advantages of the present invention will emerge from the description hereinbelow of embodiments given by way of example, in connection with the drawings.

BRIEF DESCRIPTION OF THE DRAWINGS

In the drawings:

FIG. 1 is a view in side elevation, partly in section of the upper half of one example of a first type of embodiment of the invention, that is, the type having two loading systems; the device being shown in the position of its second rotational direction, or reverse drive.

FIG. 2 is a view at right angles to FIG. 1 looking mainly from the side with the input shaft in section and some other parts broken away and shown in section.

FIG. 3 is a partly diagrammatic view in section of FIG. 1 taken along the line III—III in FIG. 1.

FIG. 4 is a top view of the device of FIG. 1 with the righthand portion shown in section.

FIG. 5 is a view like FIG. 1, but with the device in the position of the first rotational direction, or forward drive.

FIG. 10 is a view like FIG. 6, but with the device in the position of the second rotational direction, or reverse direction.

FIG. 11 is a view like FIG. 9, but with the device in the position of the second rotational direction, or reverse drive.

FIG. 12 is a longitudinal top view of the basic structure of the transmission of a front drive vehicle in which the device of the invention is integrated with the gear box.

DESCRIPTION OF SOME PREFERRED EMBODIMENTS

Figure 6:
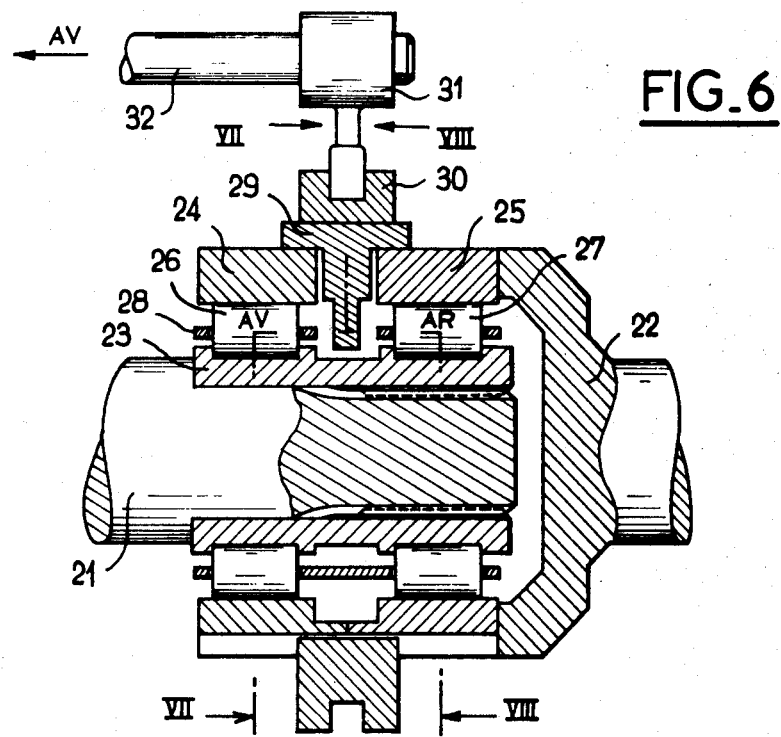
FIG. 6 is a longitudinal view partly in elevation, partly in section, of an example according to the second embodiment, that is, with a single loading system; the device being in the position of the first rotational direction, or forward drive.

The coupling or torque transfer device according to the first embodiment shown in FIG. 1 compares an input shaft 1 and an output shaft 2, which, in normal operation, has a speed which is higher by a predetermined value than the speed of the input shaft. This is accomplished by the structure of the mechanical assembly on which the coupling device, in accordance with the invention, is mounted.

A double exterior ring is connected to the output shaft. This double ring comprises two parts: a part 3 for the first direction of rotation or forward movement, and a part 4 for the second direction of rotation or reverse movement. Each of these parts 3 and 4 is welded to the other, and the whole is welded to the output shaft 2.

Two identical arrays of locking elements 5 and 6 are mounted between the double ring 3,4 and the input shaft 1. These locking elements 5 and 6 are identical rollers (See also FIGS. 2 and 3) which roll directly (in the case of the figure) on the input shaft 1, which thus functions as the interior race. Each part 3,4 of the double ring has wedging slopes 3a and 4a which are oppositely inclined and whose number corresponds to the number of locking rollers.

A single loading cage 7 is provided for the two free-wheeling arrangements for forward and reverse drives, that is, for the two arrays of locking rollers 5 and 6. This cage 7 is provided with pockets so as to retain the rollers 5 and 6 mounted inside the pockets. This single cage 7 comprises, for the row of forward-drive rollers 5, a portion which is half cut off and bent outwardly and which serves as the supporting surface for a forward-drive loading spring 8 (see FIG. 2). This loading cage 7 is mounted between on one side a bearing plate 9 with its friction liner 10, the bearing plate 9 being held in place by a retaining ring 11, and, on its other side, by a bearing ring 12. The bearing plate 9 is connected for rotation with the input shaft 1 by means of splines cut into the end of the shaft 1.

A loading control system is connected to the rotational direction control for the input shaft, which also controls the forward-reverse direction of drive. This control system comprises a control lever 13, an intermediate lever 14 and a reverse-drive loading spring 15. The assembly of this control system is mounted on a pivot pin 16, the intermediate lever 14 engages by means of two projections 14a and 14b (FIGS. 2 and 4) in grooves 17a and 17b of a reverse-drive control rod 17. In FIG. 1, the control is in the second rotational direction or reverse-drive direction. In this case, the lever 13 presses on the bearing ring 12.

The coupling or torque transfer device is shown in FIG. 2 as a side view in relation to FIG. 1. The forward-drive array of free-wheel rollers 5 with its outer ring 3 is shown in this view. Portions in FIG. 2 are broken away and shown in section to show the mounting of the intermediate lever 14 on the rod 17 and the mounting of the reverse-drive loading spring 15 in a socket 15a in the intermediate lever 14. Another portion in section indicates the mounting of the forward-drive loading spring 8 of the forward-drive locking rollers 5 in the outer forward-drive ring 3. This view shows the mounting of the levers 13 and 14 on the pivot pin 16 and the two ends 13a and 13b of the support fork of the lever 13 on the bearing ring 12. The input shaft 1 in section shows an arrow AV for the first rotational or forward-drive direction.

FIG. 3 illustrates in section the detail of the array of reverse-drive free-wheel rollers 6 with its outer ring 4. An arrow AR indicates the second rotational or reverse-drive direction.

FIG. 4 is a top view of FIG. 1 shown in section, except for the loading control system, which is in exterior view.

The coupling or torque transfer device shown in FIG. 5 is identical with that of FIG. 1, but the control is in the first rotational or forward-drive direction. In this case, the lever 13 does not press on the bearing ring 12.

FIGS. 1, 2, 3, 4, and 5 thus illustrate, in different views and according to the selected direction of rotation or forward-reverse drive, a first embodiment of the automatic coupling or torque transfer device in which there is a different loading system for the locking elements according to the selected rotational direction.

In normal operation, in the forward drive position, with the input shaft 1 rotating more slowly than the output shaft 2 (by a predetermined amount), the rollers 5 of the forward drive free-wheel are urged by the forward-drive loading spring 8 against the engaging part of the wedging slopes 3a. The forward-drive free-wheeling arrangement is thus uncoupled and in loaded position. The rollers 6 of the reverse-drive free-wheel are urged by the forward-drive loading spring 8 against the disengaging part of the wedging slopes 4a. The reverse-drive free-wheeling arrangement is thus uncoupled and in the non-loaded position.

In normal operation, in the reverse-drive position, the rollers 6 of the reverse-drive free-wheeling arrangement are urged by the reverse-drive loading system against the engaging part of the wedging slopes. The reverse-drive free-wheeling arrangement is thus uncoupled and in loaded position. The rollers 5 of the reverse-drive free-wheeling arrangement are urged by the reverse-drive loading system against the disengaging part of the wedging slopes. The forward-drive free-wheeling arrangement is thus uncoupled and in non-loaded position. The reverse-drive loading system is based on a clutch system which permits movement of the input shaft 1 to be transmitted to the cage 7. The clutch comprises the bearing plate 9 on which the cage 7 then presses, the cage 7 being urged by the bearing ring 12 and the control lever 13; the lever 13 is in its urged or loading positin due to the reverse drive position of the reverse-drive control rod 17. Further, in order that the reverse-drive loading system should function, it is necessary for the reverse-drive loading spring 15 to have a force sufficient to overcome the stress supplied by the forward-drive loading spring 8 and, further, that it be able to load the reverse-drive loading system. For good efficiency, a friction liner 10 is interposed between the cage 7 and the bearing plate 9.

In the forward-drive position, when the speed difference between the output shaft 2 and the input shaft 1 decreases and the speed of the input shaft 1 catches up with the speed of the output shaft 2, the rollers 5 which are loaded become locked in the engaging part of the wedging slopes 3a of the exterior forward-drive ring 3. The forward-drive free-wheeling arrangement is locked, and the input shaft 1 can entrain the output shaft 2, that is, there can be a speed-transfer coupling from the input shaft to the output shaft.

In the reverse-drive position, when the speed difference between the output shaft 2 and the input shaft 1 decreases and the speed of the input shaft 1 catches up with the speed of the output shaft 2, the rollers 6 which are loaded become locked in the engaging part of the wedging slopes 4a of the exterior reverse-drive ring 4. The reverse-drive free-wheeling arrangement is locked, and the input shaft 1 can drive the output shaft 2, that is, there can be a torque transfer from the input shaft to the output shaft.

It is evident that the above-described system in accordance with the first embodiment functions also when the locking elements roll on a double interior ring instead of rolling directly on the input shaft 1. Also, the system functions similarly if the input shaft 1 carries the double exterior ring, that is, if the input shaft 1 is in place of the output shaft 2 and conversely.

The coupling or torque transfer device in accordance with the second embodiment shown in FIG. 6 comprises an input shaft 21, an output shaft 22 which, in normal operation, has a speed which is greater by a predetermined value than the speed of the input shaft 21, and a double ring 23 connected to the input shaft. This ring 23 carries the two rolling tracks and, in rotation, is connected for rotation with the input shaft 21 by splines.

An exterior double ring is connected to the output shaft 22. This double ring comprises two parts: a part 24 for the first rotational direction or forward drive, and a part 25 for the second rotational direction or reverse drive. These two parts 24 and 25 are welded to each other and the assembly is welded to the output shaft 22. The double ring includes a slot or opening (See FIGS. 7 and 8).

Two identical arrays of locking elements 26 and 27 are mounted between the double ring 23 and the two parts 24 and 25 of the outer ring. The locking elements 26 and 27 are identical rollers which roll on the tracks of the rings 23 of the input shaft 21. Each part 24 and 25 of the double ring of the output shaft has wedging slopes which are inclined in opposite directions and whose number corresponds to the number of the locking rollers.

A single loading cage 28 for these two forward and reverse-drive free-wheeling arrangements, that is, for the two arrays of locking rollers 26 and 27. The cage 28 comprises a double row of pockets so as to retain the rollers 26 and 27 which are mounted inside the pockets. The constructional details of the cage will appear in the description of the FIGS. 7, 8, and 9. A loading control system is connected to the control for the rotational direction of the input shaft (or for the forward-drive, reverse-drive direction). This control system comprises a finger 29, a sliding ring 30, and a fork 31. The fork 31 engages in a circular groove of the sliding ring 30. This fork 31 is controlled by a reverse-drive control rod 32. In FIG. 6, the control is in forward-drive position.

Figure 7:
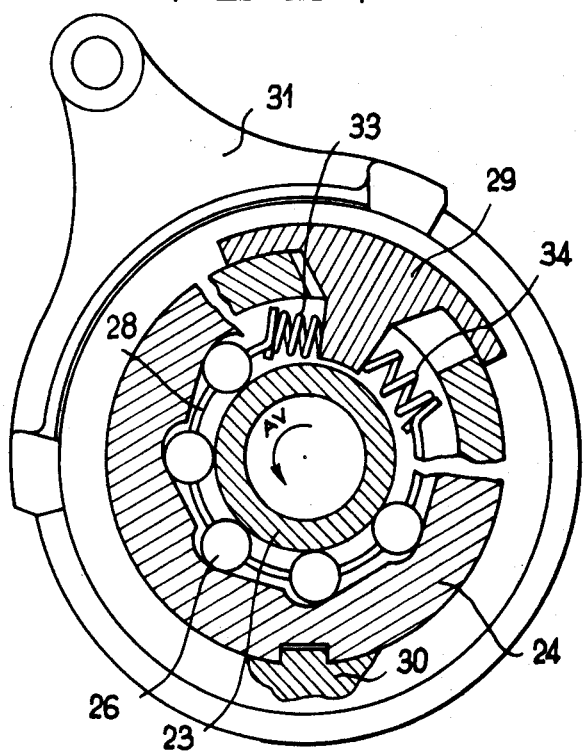
FIG. 7 is a view in section taken along the line VII—VII of FIG. 6.

In FIG. 7 the coupling or torque transfer device is shown in a side view in relation to FIG. 6. It is a section along line VII—VII which cuts the free-wheeling arrangement for forward drive. The single cage 28 has, in its central part, two bent-back portions against which the two forward and reverse-drive loading springs 33 and 34 come to bear. These springs 33 and 34 are compressed by the locking finger 29 which has two angular positions according to the selected rotational direction, or the forward or reverse direction. In the figure, the loading finger 29 is in forward-drive position. This finger 29 has an arcuate shoe which slides on the exterior ring.

The sliding ring 30 is locked by a spline for rotation with the exterior double ring, but it can slide in that ring by means of the spline and groove. This sliding ring 30 is a ring which surrounds the outer double ring. The fork 31 is seen here in exterior view. An arrow AV indicates the first rotational or forward-drive direction, which is the functional direction of this figure.

Figure 8:
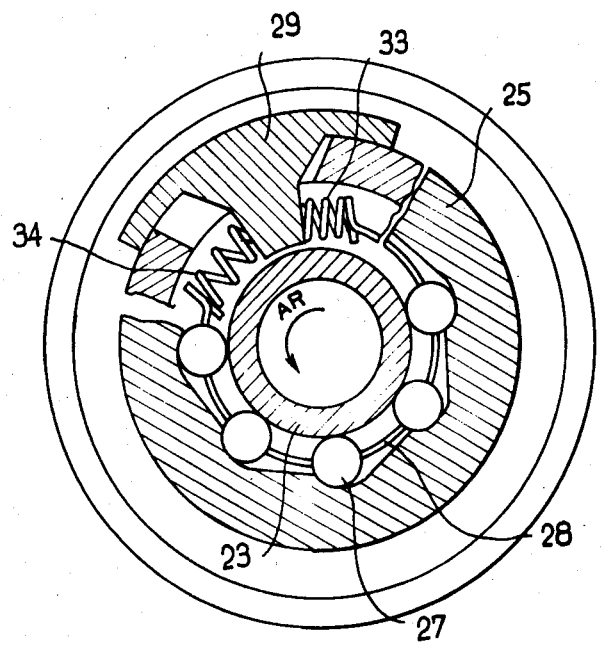
FIG. 8 is a view in section taken along the line VIII—VIII of FIG. 6.

FIG. 8 shows, viewed from the side opposite that of FIG. 7, the device in section along the line VIII—VIII which cuts the free-wheel member for the rear drive. The loading finger 29 is in the position for front drive. An arrow AR indicates the second direction of rotation or rear drive.

Figure 9:
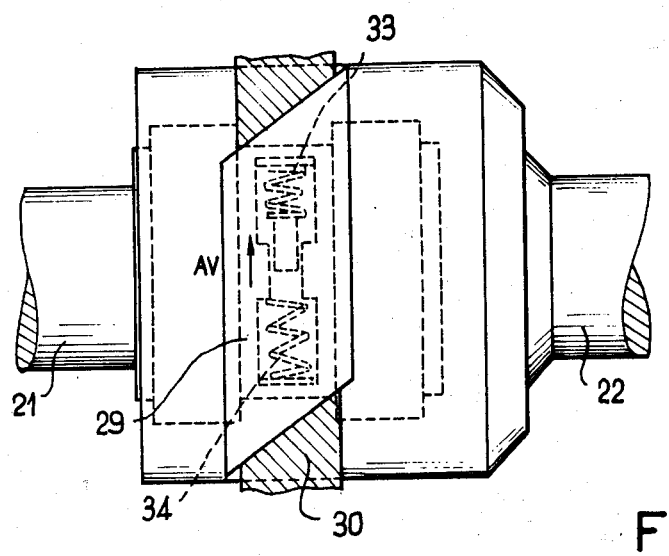
FIG. 9 is a top view of the device of FIG. 6, with some parts broken away and shown in section.

FIG. 9 is a top view of FIG. 6. The sliding ring 30 is in partial section, and the shoe of the finger 29 is seen in an exterior view. The shoe of the finger 29 has two faces and fits in the sliding ring 30; these two surfaces are helical in shape, and the sliding ring 30 has a recess with two faces having the same helical shape as the corresponding faces of the shoe.

FIGS. 10 and 11 are views respectively like FIGS. 6 and 9, but with the control placed in the second rotational or reverse-drive direction.

FIGS. 6, 7, 8, 9, 10, and 11 thus illustrate, in the different views and depending on the selected rotational direction or forward-drive reverse-drive, a second embodiment of the automatic coupling or torque transfer device, in which there is a single loading system for the locking elements.

During normal operation, in the forward-drive position, the input shaft 21 rotating more slowly than the output shaft 21 (by a predetermined value), the rollers 26 of the forward-drive free-wheeling arrangement are urged by the forward-drive loading spring 33 against the engaging part of the wedging slopes. The forward-drive free-wheeling arrangement is thus uncoupled and in loaded position. The rollers 27 of the reverse-drive free-wheeling arrangement are urged by the forward-drive loading spring 33 against the disengaging part of the wedging slopes. The reverse-drive free-wheeling arrangement is thus uncoupled and in non-loaded position.

During normal operation, in the reverse-drive position, the rollers 27 of the reverse-drive free-wheeling arrangement are urged by the reverse-drive loading spring 34 against the engaging part of their wedging slopes. The reverse-drive free-wheeling arrangement is thus uncoupled and in loaded position. The rollers 26 of the forward-drive free-wheeling arrangement are urged by the reverse-drive locking spring 34 against the disengaging part of the wedging slopes. The forward-drive free-wheeling arrangement is thus uncoupled and in non-loaded position.

The loading system is unique and functions in the following manner. When one selects the rotational or forward-drive reverse-drive direction, one acts on the reverse-drive control rod 32, which moves the fork 31 along the axis of the device. The fork 31, by moving axially, entrains the sliding ring 30. The ring 30 entrains, in turn, the finger 29 by means of the helical faces of the shoe of the finger 29, which faces are in contact with the corresponding faces of the recess in the ring 30. The finger 29, not being able to move axially, then moves rotationally and compresses the loading spring corresponding to the selected rotational direction, the spring urging and loading the cage 28. The loading spring which is not in loading position is held in place due to the fact that it is mounted in a slightly preloaded condition.

In the forward-drive position, when the speed difference between the output shaft 22 and the input shaft 21 decreases, and the speed of the input shaft 21 catches up with the speed of the output shaft 22, the rollers 26 which are loaded become locked in the engaging part of the wedging slopes of the exterior forward-drive ring 24. The forward-drive free-wheeling arrangement is locked, and the input shaft 21 can entrain the output shaft 22, that is, torque transfer can take place from the input shaft to the output shaft.

In the reverse-drive position, when the speed difference between the output shaft 22 and the input shaft 21 decreases and the speed of the input shaft 21 catches up with the speed of the output shaft 22, the rollers 27 which are loaded become locked in the engaging part of the wedging slopes of the outer reverse-drive ring 25. The reverse-drive free-wheeling arrangement is locked, and the input shaft 21 can entrain the output shaft 22, that is, torque transfer can take place from the input shaft to the output shaft.

It is obvious that the above-described system according to the second embodiment functions similarly if the input shaft carries the outer double ring, that is, if the input shaft is in place of the output shaft and conversely.

FIG. 12 shows an example of the mounting of the device of the invention on a transmission of an automotive vehicle. In the figure, the automatic coupling device 40 is integrated with the gear box 41 of a front drive vehicle. The input shaft 42 of the coupling device is the secondary shaft of the gear box, which also controls the front axle unit 43. The output shaft 44 of the coupling device 40 is the transmission shaft which controls the rear axle unit 45. The structure of the transmission of the vehicle is such that, when all wheels rotate at the same speed, there is a speed difference between the output shaft 44 and the input shaft 42 of the coupling device 40.

When there is a decrease of the adherence of the driving axle, that is, the front axle, the speed of this axle tends to increase in relation to the speed of the rear axle, and therefore the speed of the input shaft 42 of the coupling device 40 tends to increase and to catch up with the speed of the output shaft 44 of said device, and that until the free-wheeling arrangement of the device for the operational direction becomes locked. The engine torque then passes to the rear axle.

It is quite apparent that this example of use is not limiting and that in particular the automatic clutch device of the invention may be placed at any location of the transmission of a vehicle. In particular, the device can be integrated with any axle unit or with the gear box.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A coupling or torque transfer device between an input shaft and an output shaft, characterized in that the device is automatic, functioning when the speed differences, resulting from the mechanical structure, between the input shaft and the output shaft reaches a certain value, the device functioning in both directions of rotation and having selection means for determining the direction of rotation, said device comprising:
   a double ring connected to one said shaft and encircling the other said shaft and providing a pair of identical series of interior wedging slopes,
   two identical arrays of a series of rollers, said rollers mounted respectively between said double ring and the encircled said shaft,
   loading means for said arrays of rollers functioning for both directions of rotation and acting on one of the arrays of rollers in one direction of rotation and acting on the other of the arrays of rollers in the other direction of rotation, and control means connected to said selection means for actuating said loading means.

2. A coupling or torque transfer device between an input shaft and an output shaft, characterized in that the device is automatic, functioning when the speed differences, resulting from the mechanical structure, between the input shaft and the output shaft reaches a certain value, the device functioning in both directions of rotation and having selection means for determining the direction of rotation, said device comprising:
   a first inner double ring connected to the input shaft and providing a pair of cylindrical raceways,
   a second outer double ring connected to the output shaft and encircling and radially in line with said first double ring and providing a pair of series of wedging slopes,
   two arrays of a series of rollers mounted respectively between said double rings, said rollers retained by a single cage,
   loading means for said arrays of locking elements functioning for both directions of rotation and acting on one of the arrays of locking elements in one direction of rotation and acting on the other of the arrays of locking elements in the other direction of rotation, and
   control means connected to said selection means for actuating said loading means, said loading means comprising:
   a finger member connected to said selection means and
   a pair of loading springs on opposite sides of said finger member, the finger member bearing on and loading one said spring at a time, depending on the selected rotational direction,
   the single cage having two recesses, one for each spring, and a slot between them into which the finger member extends.

3. A coupling or torque transfer device in accordance with claim 2, wherein
   said selection means comprises a control shaft arranged for translation and connected to said finger member, so that upon translation of said control shaft said finger member is moved and
   said loading means includes
   a sliding ring having a recess therein, said finger member having a shoe in said recess,
   said finger member moving rotationally in one direction or in the other according to the movement of the control shaft in translation in one direction or the other.

4. A coupling or torque transfer device in accordance with claim 2 or 3 wherein the two roller arrays are identical to each other and the wedging slopes in the corresponding outer rings are identical to each other.

5. A coupling or torque transfer device between an input shaft and an output shaft axially in line with said input shaft, characterized in that the device is automatic, functioning when the speed differences, resulting from the mechanical structure, between the input shaft and the output shaft reaches a certain value, the device functioning in both directions of rotation and having selection means for determining the direction of rotation, said device comprising:
   a pair of double rings secured to each other and to the output shaft and encircling the input shaft and providing a pair of series of wedging slopes,
   two arrays of a series of locking rollers mounted respectively between said double rings and said input shaft and directly in contact with said input shaft and with said wedging slopes, a single cage retaining said two arrays of rollers, loading means for said array of locking elements functioning for both directions of rotation and acting on one of the arrays of locking elements in one direction of rotation and acting on the other of the arrays of locking elements in the other direction of rotation, and control means connected to said selection means for actuating said loading means, wherein the loading means comprises two loading devices, namely:

a first loading device for one rotational direction comprising a spring carried by said double ring and bearing against a first end of said cage, and a second loading device for the other rotational direction comprising, a sliding ring system of the cage which rotates with the input shaft and including a bearing plate splined to said input shaft at said first end of said double ring, a bearing ring at a second end of said double ring, and lever means connected to said control means, which, only when actuated, presses against said bearing ring and urges said bearing ring and said cage against said bearing plate.

6. A coupling or torque transfer device in accordance with claim 5 wherein said selection means comprises a control shaft arranged for translation, and said lever means comprises a pivot pin, transverse to said control shaft, a first lever pivotally mounted at one end on said pivot pin and connected at its other end to said control shaft, a second lever pivotally mounted at one end on said pivot pin, the other end facing said bearing ring, and a loading spring connecting both said levers and in one position holding said second lever apart from the bearing ring and in another position causing said second lever to press on the bearing ring.

7. A coupling or torque transfer device in accordance with claim 5 wherein the two roller arrays are identical to each other and the wedging slopes in the corresponding outer rings are identical to each other.

8. A coupling or torque transfer device between an input shaft and an output shaft, characterized in that the device is automatic, functioning when the speed differences, resulting from the mechanical structure, between the input shaft and the output shaft reaches a certain value, and device functioning in both directions of rotation and having selection means for determining the direction of rotation, said device comprising:

a double ring connected to one said shaft and encircling the other said shaft and providing a pair of series of interior wedging slopes, two arrays of a series of rollers, said rollers of both said arrays retained by a single cage, said rollers mounted respectively between said double ring and the encircled said shaft, said rollers directly engaging the enclosed said shaft, loading means for said arrays of rollers functioning for both directions of rotation and acting on one of the arrays of rollers in one direction of rotation and acting on the other of the arrays of rollers in the other direction of rotation, and control means connected to said selection means for actuating said loading means, said loading means comprising:

first loading means for one rotational direction comprising a spring carried by said double ring and bearing against a first end of said cage and second loading means for the other rotational direction comprising a bearing plate splined to said encircled shaft at said first end of said double ring, a bearing ring at a second end of said double ring, and lever means connected to said control means, which, only when actuated, bears against said bearing ring and urges said bearing ring and said cage against said bearing plate.

9. A coupling or torque transfer device in accordance with claim 8 wherein said selection means comprises a control shaft arranged for translation, and said lever means comprises a pivot pin transverse to said control shaft, a first lever pivotally mounted at one end on said pivot pin and connected at its other end to said control shaft, a second lever pivotally mounted at one end on said pivot pin, the other end facing said bearing ring, and a loading spring connecting both said levers and in one position holding said second lever apart from the bearing ring and in another position causing said second lever to press on the bearing ring.

10. A coupling or torque transfer device between an input shaft and an output shaft, characterized in that the device is automatic, functioning when the speed differences, resulting from the mechanical structure, between the input shaft and the output shaft reaches a certain value, the device functioning in both directions of rotation and having selection means for determining the direction of rotation, said device comprising:

a double ring connected to one said shaft and encircling the other said shaft and providing a pair of series of interior wedging slopes, a second double ring mounted on the encircled shaft, two arrays of a series of rollers, said rollers of both said arrays retained within a single cage, said rollers interposed between said two double rings, the second double ring providing a pair of raceways for the rollers, loading means for said arrays of rollers functioning for both directions of rotation and acting on one of the arrays of rollers in one direction of rotation and acting on the other of the arrays of rollers in the other direction of rotation, and control means connected to said selection means for actuating said loading means, said loading means comprising:

a finger member connected to said selection means, and a pair of loading springs on opposite sides of said finger member, the finger member bearing on and loading one said spring at a time, depending on the selected rotational direction, the single cage having two recesses, one for each spring, and a slot between them into which the finger member extends.

11. A coupling or torque transfer device in accordance with claim 10, wherein said selection means comprises a control shaft arranged for translation and connected to said finger member, so that upon translation of said control shaft said finger member is moved and said loading means includes a sliding ring having a recess therein, said finger member having a shoe in said recess, said finger member moving rotationally in one direction or in the other according to the movement of the control shaft in translation in one direction or the other.

12. A coupling or torque transfer device in accordance with any of claims 8, 9, 10 or 11 wherein the two roller arrays are identical to each other and the wedging slopes in the corresponding outer rings are identical to each other.

* * * * *